(12) United States Patent
Liu et al.

(10) Patent No.: US 10,346,220 B2
(45) Date of Patent: Jul. 9, 2019

(54) METHOD AND SYSTEM FOR LOCKING STORAGE AREA IN STORAGE SYSTEM

(71) Applicant: EMC IP Holding Company LLC, Hopkinton, MA (US)

(72) Inventors: Yousheng Liu, Beijing (CN); Jamin Jianbin Kang, Beijing (CN); Xinlei Xu, Beijing (CN); Ruiyong Jia, Beijing (CN); Jian Gao, Beijing (CN); Lifeng Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 15 days.

(21) Appl. No.: 15/630,883

(22) Filed: Jun. 22, 2017

(65) Prior Publication Data

US 2018/0165134 A1    Jun. 14, 2018

(30) Foreign Application Priority Data

Jun. 22, 2016   (CN) .......................... 2016 1 0459979

(51) Int. Cl.
```
G06F 9/52      (2006.01)
G06F 13/26     (2006.01)
G06F 3/06      (2006.01)
```
(52) U.S. Cl.
CPC ............ *G06F 9/526* (2013.01); *G06F 3/0604* (2013.01); *G06F 3/0622* (2013.01); *G06F 3/0689* (2013.01); *G06F 13/26* (2013.01)

(58) Field of Classification Search
None
See application file for complete search history.

(56) References Cited

U.S. PATENT DOCUMENTS

| | | | |
|---|---|---|---|
| 5,845,147 A | 12/1998 | Vishlitzky et al. |
| 5,913,227 A | 6/1999 | Raz et al. |
| 5,987,550 A | 11/1999 | Shagram |
| 8,706,679 B2 | 4/2014 | Rao |
| 8,862,639 B1 | 10/2014 | Rao |
| 8,935,560 B2 | 1/2015 | Lu et al. |
| 9,398,016 B1 | 7/2016 | Chakraborty et al. |
| 9,485,255 B1 | 11/2016 | Avital |

(Continued)

*Primary Examiner* — Henry Tsai
*Assistant Examiner* — Aurangzeb Hassan
(74) *Attorney, Agent, or Firm* — BainwoodHuang

(57) ABSTRACT

A method and a system for locking a storage area in a storage system. There is provided a method for locking a storage system in a storage system, where the storage system comprises a first controller, a second controller, a first communication area and a second communication area. The method comprises: a first lock flag associated with the storage area is written to the first communication area in response to receiving at the first controller a data access request with respect to the storage area, where the first communication area being readable and writable to the first controller and being readable to the second controller. A second lock flag associated with the storage area is read from the second communication area, where the second communication area being readable to the first controller and being readable and writable to the second controller. The storage area is locked by the first controller in response to the second lock flag indicating that the storage area is not locked by the second controller.

15 Claims, 11 Drawing Sheets

(56) References Cited

U.S. PATENT DOCUMENTS

| | | |
|---|---|---|
| 9,619,286 B1 | 4/2017 | Wagner et al. |
| 2006/0218556 A1* | 9/2006 | Nemirovsky .......... G06F 9/3851 |
| | | 718/104 |
| 2013/0031069 A1* | 1/2013 | Dudgeon .......... G06F 17/30171 |
| | | 707/704 |
| 2014/0108796 A1* | 4/2014 | Johnson .............. G06F 21/6272 |
| | | 713/167 |
| 2015/0012704 A1* | 1/2015 | Watanabe ............. G06F 3/0689 |
| | | 711/114 |
| 2017/0116247 A1* | 4/2017 | Jonsson .................... G06F 9/52 |

* cited by examiner

METHOD AND SYSTEM FOR LOCKING STORAGE AREA IN STORAGE SYSTEM

RELATED APPLICATIONS

This application claim priority from Chinese Patent Application Number CN201610459979.8, filed on Jun. 22, 2016 at the State Intellectual Property Office, China, titled "METHOD AND SYSTEM FOR LOCKING STORAGE AREA IN STORAGE SYSTEM" the contents of which is herein incorporated by reference in its entirety.

FIELD

Various embodiments of the present invention relate to storage management, and more specifically, to a method and a system for locking a storage area in a storage system (e.g. Redundant Array of Independent Disks, RAID).

BACKGROUND

With the development of data storage techniques, various data storage devices now provide users with higher and higher data storage capacity, and also their speed of accessing data has been increased greatly. Besides the increase of data storage capacity, users also impose greater and greater demands on data reliability and response time of storage systems. So far various RAID-based data storage systems have been developed to increase data reliability. When one or more disks in a storage system fail, data in failed disks can be recovered from data in other disks operating normally.

The storage system may be accessed via storage control nodes. In a typical active-active type of storage system, two storage control nodes work jointly to process data access operations on the storage system and further provide higher usability and better performance. Each storage control node has its own memory (e.g. cache), and memories in two storage control nodes operate in a mirrored style. The two storage control nodes may receive in parallel data access instructions from the outside, so such a problem might arise that the two storage control nodes concurrently perform operations to the same storage area. At this point, it becomes a focus of research regarding how to provide a secure and reliable locking mechanism to avoid conflicts between operations of the two storage control nodes.

SUMMARY

Therefore, it is desirable to develop and implement a technical solution for locking a storage area in a storage system. It is desired that the technical solution can be compatible with existing storage systems and manage them in a more secure and reliable way without an extra hardware device added to storage systems.

In one embodiment of the present invention, there is provided a method for locking a storage system in a storage system, the storage system includes a first controller, a second controller, a first communication area and a second communication area. In the method, a first lock flag associated with the storage area is written to the first communication area in response to receiving at the first controller a data access request with respect to the storage area, where the first communication area being readable and writable to the first controller and being readable to the second controller. A second lock flag associated with the storage area is read from the second communication area, where the second communication area being readable to the first controller and being readable and writable to the second controller. The storage area is locked by the first controller in response to the second lock flag indicating that the storage area is not locked by the second controller.

In one embodiment of the present invention, there is provided a system for locking a storage area in a storage system. The system includes: one or more processors; a memory coupled to at least one processor of the one or more processors; computer program instructions stored in the memory, when executed by the at least one processor, the computer program instructions causing the system to execute a method for locking a storage area in a storage system. In the method, a first lock flag associated with the storage area is written to the first communication area in response to receiving at the first controller a data access request with respect to the storage area, where the first communication area being readable and writable to the first controller and being readable to the second controller. A second lock flag associated with the storage area is read from the second communication area, where the second communication area being readable to the first controller and being readable and writable to the second controller. The storage area is locked by the first controller in response to the second lock flag indicating that the storage area is not locked by the second controller.

With the technical solution of the present invention, a locking mechanism may be provided in a storage system in a more secure manner, and further a more stable and reliable storage system may be provided.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
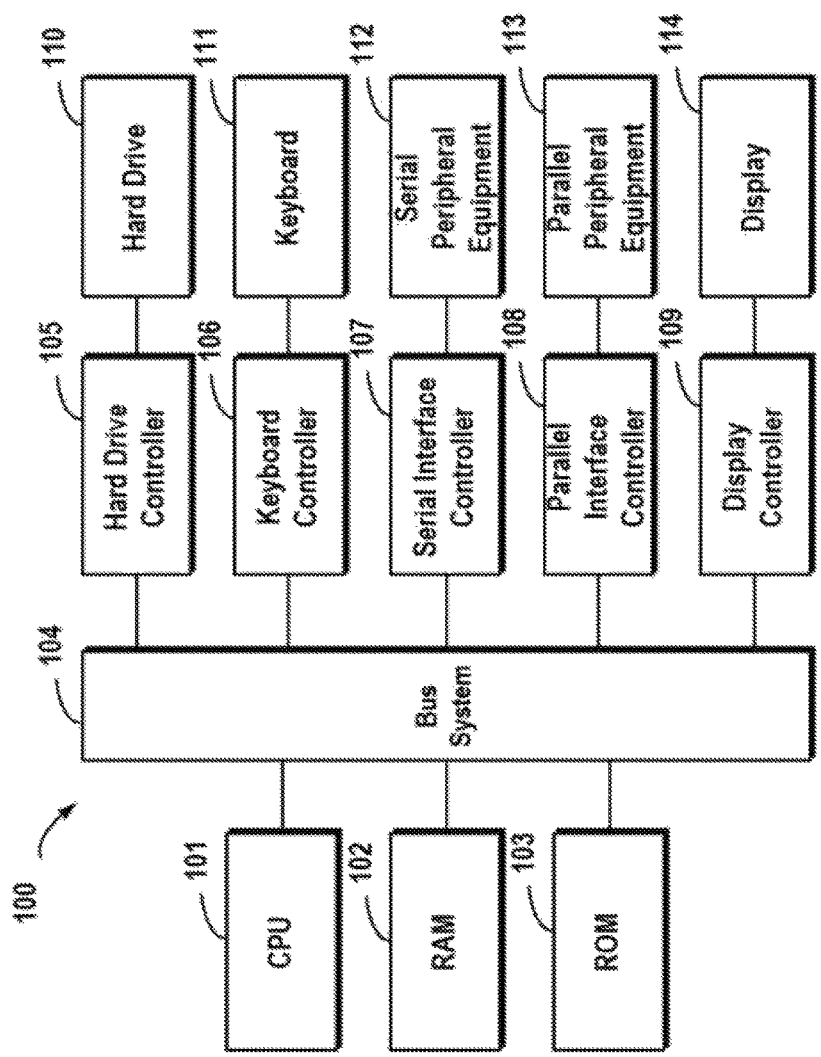
FIG. 1 schematically illustrates a block diagram of an exemplary computer system which is applicable to implement the embodiments of the present invention.

FIG. 1 illustrates an exemplary computer system 100 (which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Redundant Array of Independent Disks (RAID) may combine multiple storage devices in to an array of disks. By providing redundant storage devices, reliability of an entire disk group is caused to be significantly higher than a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc. The operating system may consider a disk array, consisting of multiple storage devices, as a single logical storage unit or disk. By partitioning the disk array into multiple stripes, data may be distributed across multiple storage devices, so that low delay and high bandwidth may be achieved, and data may be recovered to some extent when some disks are broken.

Figure 2A:
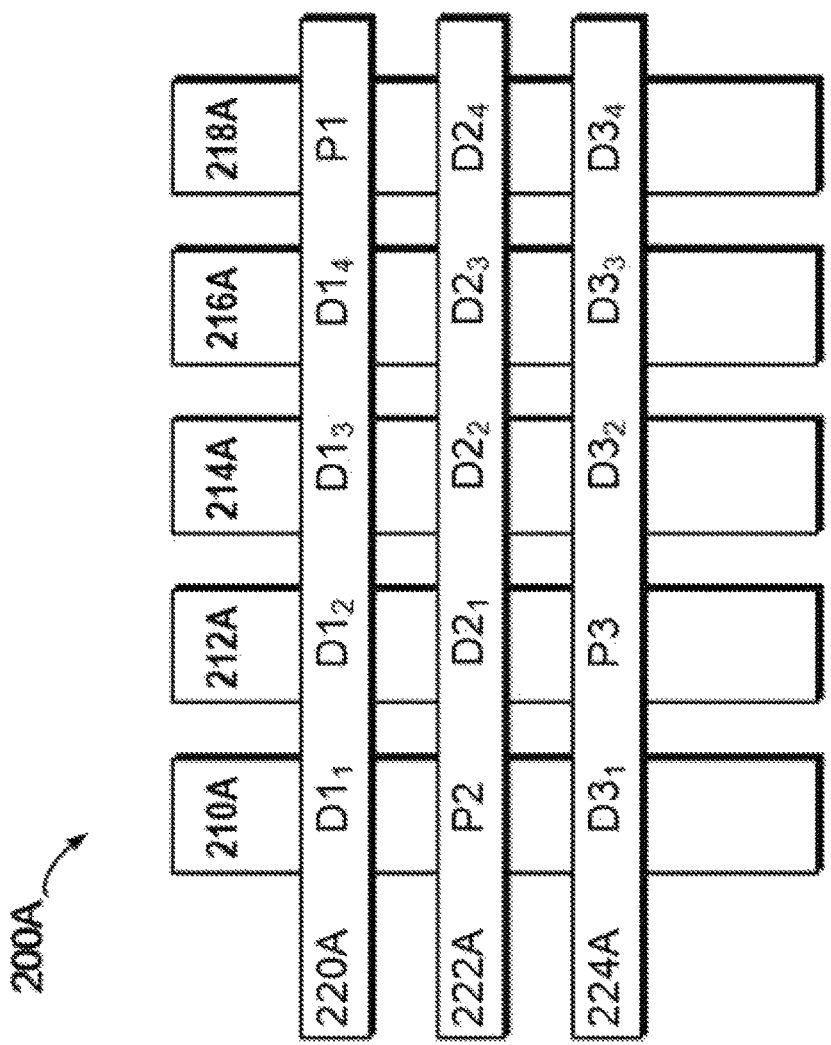
FIG. 2A schematically illustrates a schematic view of a structure of a Redundant Array of Independent Disks according to one technical solution, FIG. 2B schematically illustrates a schematic view of rebuilding process of a Redundant Array of Independent Disks according to one technical solution.

FIG. 2A schematically illustrates a schematic view 220A of a structure of RAID according to one technical solution. In this figure, working principles of RAID are illustrated by taking RAID-5 that consists of five independent storage devices (210A, 212A, 214A, 216A and 218A) as an example. It should be noted although in FIG. 2A there are schematically shown five storage devices, in other embodiments more or less storage devices may be included according to different versions of RAID. Moreover, although in FIG. 2A there are shown stripes 220A, 222A and 224A, in other examples the RAID system may further include different numbers of stripes.

In RAID, a stripe crosses multiple physical storage devices (for example, stripe 220A crosses storage devices 210A, 212A, 214A, 216A and 218A). The stripe may be construed as a storage area among multiple storage devices which satisfies a given address range. Data stored in stripe 220 includes multiple parts: a data block $D1_1$ stored in storage device 210A, a data block $D1_2$ stored in storage device 212A, a data block $D1_3$ stored in storage device 214A, a data block $D1_4$ stored in storage device 216A, and a data block P1 stored in storage device 218A. In this example, data blocks $D1_1$, $D1_2$, $D1_3$, and $D1_4$ are stored data, and data block P1 is a checksum of the stored data.

The mode of storing data in other stripes is similar to that in stripe 220A, and the difference is that a checksum about other data block may be stored in other storage device that storage device 218A. In this way, when one of the multiple storage devices 210A, 212A, 214A, 216A and 218A degrades, data in the degraded device may be recovered from other normal storage devices.

Figure 2B:
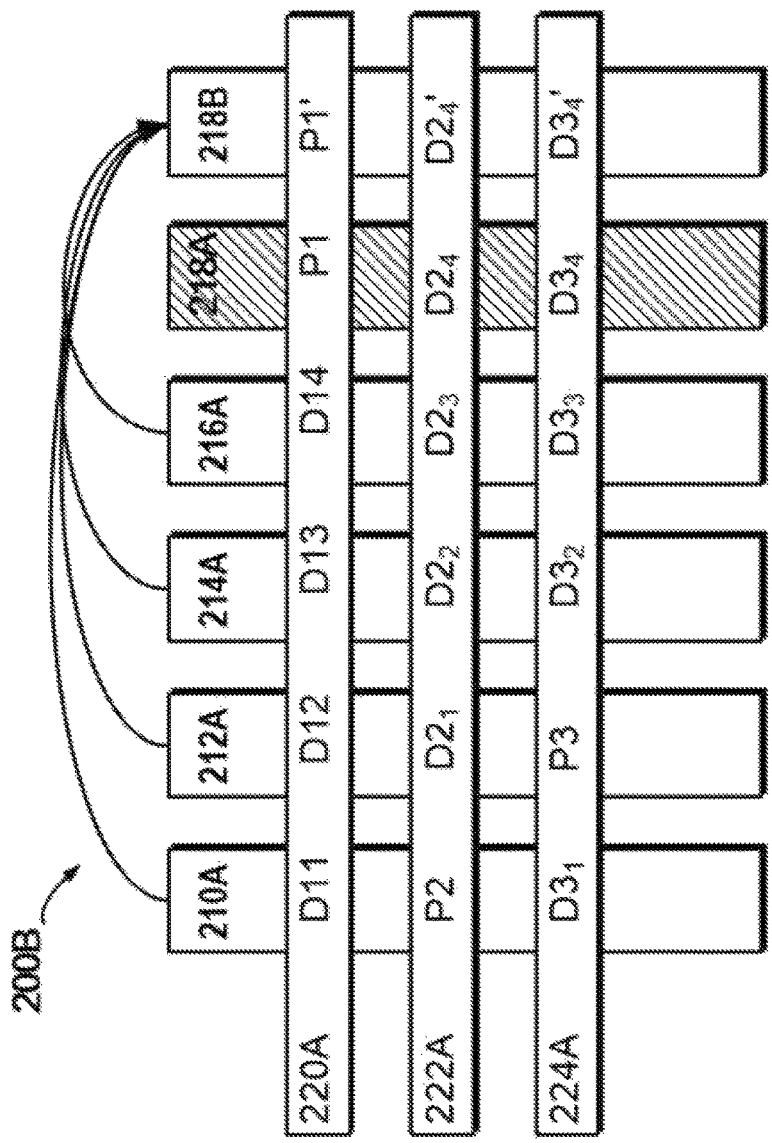

FIG. 2B schematically illustrates a schematic view 220B of rebuilding process of RAID. As shown in FIG. 2B, when one storage device (e.g. Storage device 218A shown in shadow) degrades, data may be recovered from other storage devices 210A, 212A, 214A and 216A operating normally. At this point, a new backup storage device 218B may be added to RAID to replace storage device 218A. In this way, recovered data may be written to 218B, and system rebuilding may be realized.

Figure 3:
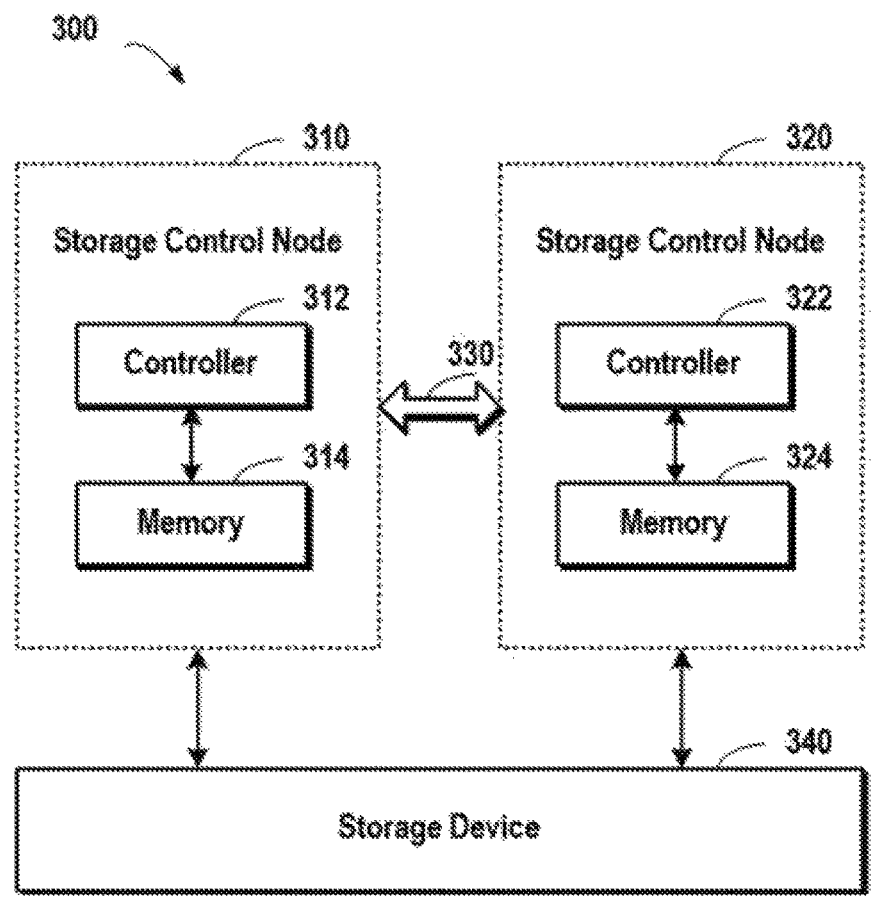
FIG. 3 schematically illustrates a schematic view of a method for realizing a lock in a storage system according to one technical solution.

FIG. 3 schematically illustrates a schematic view of a method for locking in a storage system according to one technical solution. As shown in FIG. 3, a storage system 300 may provide data access service to the outside via one or more storage control nodes. In this example, storage system 300 may include storage control nodes 310 and 320. During operation of storage system 300, two storage control nodes 310 and 320 may provide service to the outside in parallel. If one node fails, then the other node may continue working.

Storage control node 310 may include a controller 312 and a memory 314 (e.g. cache). When storage control node 310 receives an access request (e.g. read-write request) from an external host, controller 312 processes the request. Similarly, another storage control node 320 includes a controller 322 and a corresponding memory 324, and operates in a similar manner of storage control node 310. Two storage control nodes 310, 320 may operate in parallel for processing different access requests.

An internal communication channel 330 is arranged in the storage system, for transferring messages (e.g. lock messages) between two storage control nodes 310 and 320. Specifically, when one controller 312 receives access to the same storage area, the controller 312 needs to deliver a lock message to the other controller 322 so as to notify that the accessed storage area has been locked by the controller 312. In this manner, the controller 322 is prevented from accessing the locked storage area during the lock. However, once internal communication channel 330 fails, the lock message cannot be delivered between two storage control nodes 310 and 320, and further data conflicts in storage system 300 arise.

So far technical solutions have been developed to provide a more reliable locking mechanism by creating a dedicated reliable communication channel or building a third entity additionally. Nevertheless, these technical solutions require extra hardware and/or software configuration, so it is not conducive to popularize these technical solutions in existing storage systems.

In view of above disadvantages in the prior art, various embodiments of the present invention provide a technical solution for locking a storage area in a storage system. Specifically, there is provided a method for locking a storage area in a storage system, the storage system including a first controller, a second controller, a first communication area as well as a second communication area. In the method, a first lock flag associated with the storage area is written to the first communication area in response to receiving at the first controller a data access request with respect to the storage area, where the first communication area being readable and writable to the first controller and being readable to the second controller. A second lock flag associated with the storage area is read from the second communication area, where the second communication area being readable to the first controller and being readable and writable to the second controller. The storage area is locked by the first controller in response to the second lock flag indicating that the storage area is not locked by the second controller.

Figure 4:
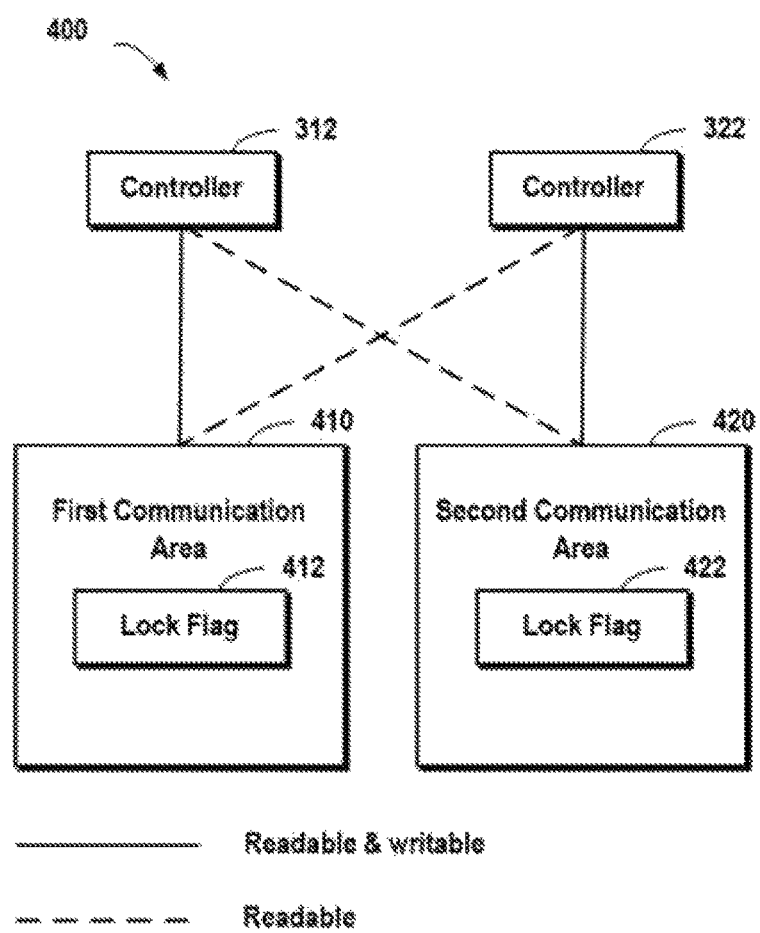
FIG. 4 schematically illustrates an architecture view of a technical solution for locking a storage area in a storage system according to one embodiment of the present invention.

FIG. 4 schematically illustrates an architecture view of a technical solution for locking a storage area in a storage system 400 according to one embodiment of the present invention. As shown in FIG. 4, the storage system includes two controllers, namely controller 312 and controller 322.

Moreover, two communication areas are arranged in the storage system, namely a first communication area 410 and a second communication area 420. The two communication areas are accessible to the controllers 312 and 322, with difference in access permission. Readable and writable access permission is shown in solid lines; for example, the first communication area 410 is readable and writable to the controller 312, and the second communication area 420 is readable and writable to the controller 322. Readable access permission is shown in dashed lines; for example, the second communication area 420 is readable to the controller 312, and the first communication area 410 is readable to the controller 322.

As shown in FIG. 4, by arranging in the storage system the first and second communication areas to which the two controllers have different access permission, messages are delivered via the two communication areas, and further the need to build an extra communication channel between the two controllers for delivering lock messages is avoided. In response to the controller 312 receiving an access request with respect to a storage area, a lock flag 412 may be written to first communication area 410, to indicate that the controller 312 desires to lock the storage area associated with the data access request. At the other controller 322, in response to receiving an access request with respect to the storage area, a lock flag 422 may be written to second communication area 410, to indicate that controller 322 desires to lock the storage area associated with the data access request.

At this point, by reading the lock flag 422 in the second communication area 420, the controller 312 determines whether or not the storage area desired to access has been locked by controller 322. If the lock flag 422 indicates that the storage area has not been locked by the controller 322, then the controller 312 may lock the storage area and execute corresponding data access operation.

Figure 5:
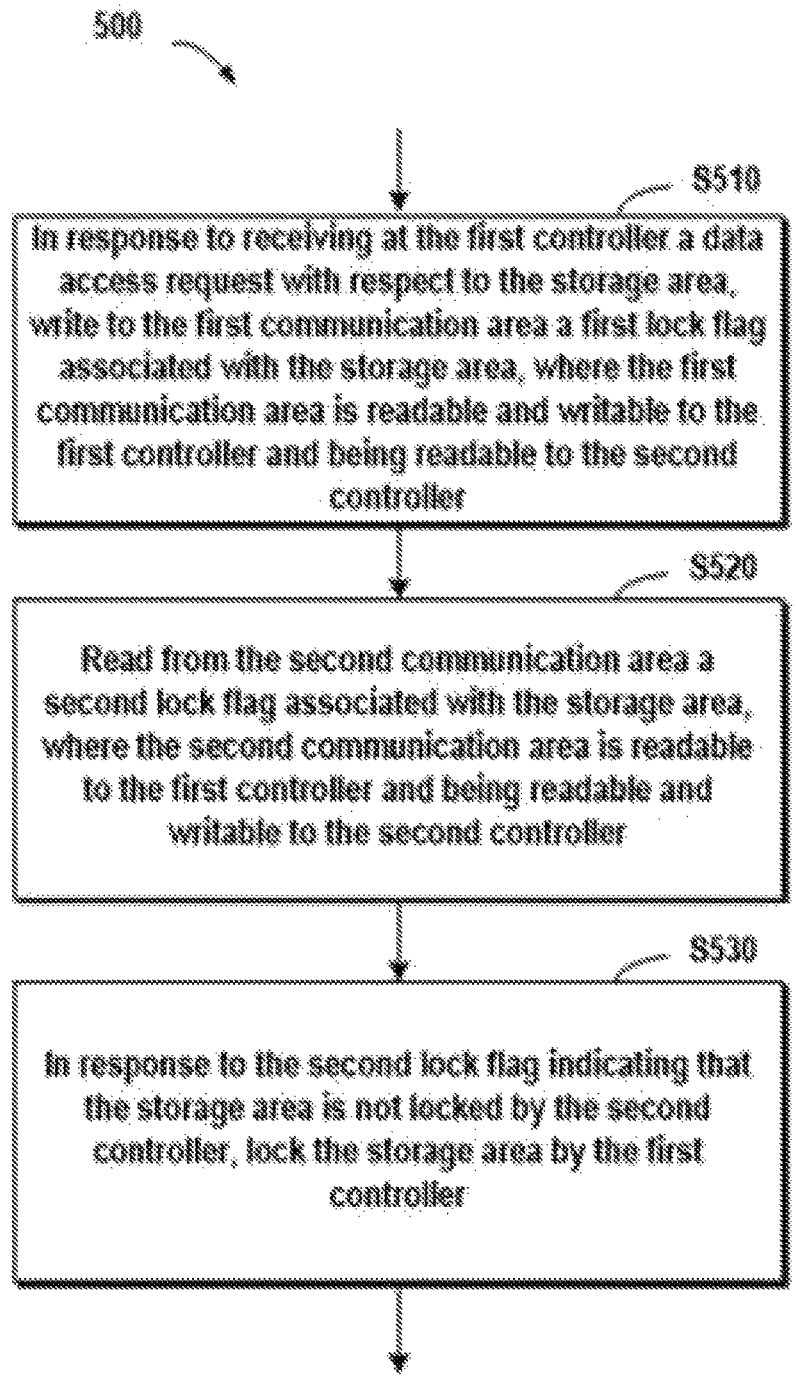
FIG. 5 schematically illustrates a flowchart of a method for locking a storage area in a storage system according to one embodiment of the present invention.

With reference to FIG. 5, detailed description is presented below to concrete steps of the method of the present invention. FIG. 5 schematically illustrates a flowchart 500 of a method for locking a storage area in a storage system according to one embodiment of the present invention. First of all, in step S510, in response to receiving at a first controller a data access request with respect to the storage area, a first lock flag associated with the storage area is written to a first communication area, where the first communication area is readable and writable to the first controller and is readable to a second controller. In this embodiment, a shareable communication area that is accessible to both the first and second controllers is allocated in the storage system as an intermediary agent for message delivery, so that overheads for transferring lock messages by building an extra communication channel between two controllers are avoided.

In step S520, a second lock flag associated with the storage area is read from the second communication area, where the second communication area is readable to the first controller and is readable and writable to the second controller. In this embodiment, each of the two controllers can write a lock flag to its own communication area, to indicate that the controller desires to lock the storage area. In the meantime, each one of the two controllers may read, from a communication area that is readable and writable to the other controller, a lock flag describing the lock state of the other controller towards the storage area. In this way, it may be determined whether such a "conflict" of both controllers wanting to concurrently lock and access the same storage area occurs between the controllers, and further it may be determined which controller gains the access permission.

In step S530, in response to the second lock flag indicating that the storage area is not locked by the second controller, the storage area is locked by the first controller. In this step, that the first controller locks the storage area is indicated by the first lock flag in the first communication area. For example, the first lock flag is set to "locked."

In this example, with the respective lock flags written to the first and second communication areas, a controller desiring to lock a storage area may determine whether or not the storage area desired to access has been locked by the peer controller by reading the lock flag written by the peer controller. In this way, a dedicated communication channel does not need to be built between the first controller and the second controller, but lock messages are transferred based on an existing communication channel (e.g. data transmission channel between a controller and a storage device like a disk device) in the storage system.

In one embodiment of the present invention, to avoid the situation where a storage area is locked by one controller for a long time and thus cannot be accessed by the other controller, priorities may be set to storage areas in the storage system, and it is provided that a controller with a higher priority has preferential access permission.

Figure 6:
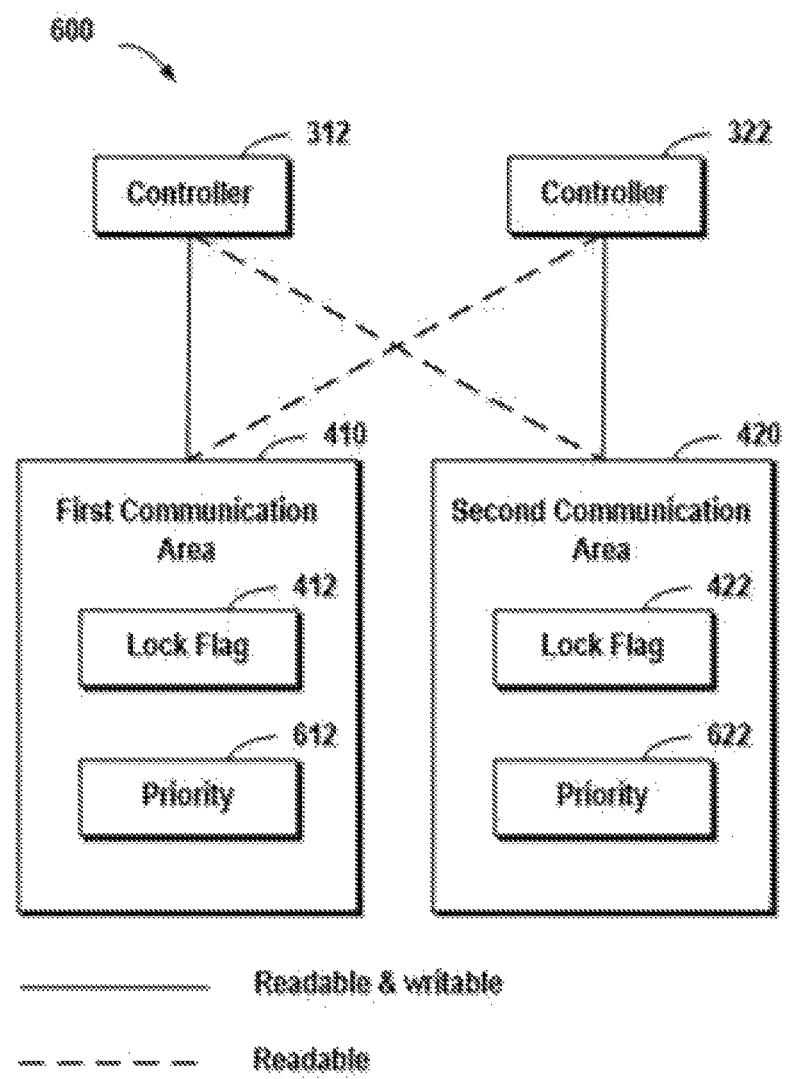
FIG. 6 schematically illustrates an architecture view of a technical solution for locking a storage area in a storage system according to one embodiment of the present invention.

FIG. 6 schematically illustrates an architecture view 600 of a technical solution for locking a storage area in a storage system according to one embodiment of the present invention. The architecture shown in FIG. 6 is similar to contents in FIG. 4, and the difference is that FIG. 6 further includes priorities. Specifically, in the first communication area 410 there is included a priority 612 to indicate the access priority of the controller 412 to the storage area, and in the second communication area 420 there is included a priority 422 to indicate the access priority of the controller 422 to the storage area.

In one embodiment of the present invention, in response to the second lock flag indicating that the storage area is locked by the second controller, a first priority associated with the first lock flag is read from the first communication area, and a second priority associated with the second lock flag is read from the second communication area; and the storage area is locked based on a comparison between the first priority and the second priority.

In one embodiment of the present invention, the locking the storage area based on a comparison between the first priority and the second priority includes: in response to the first priority being lower than the second priority, unlocking the storage area by the first controller; and updating the first lock flag to "unlocked."

Continuing the foregoing example, concrete values of priorities may be set initially or in response to other conditions being triggered. For example, when the storage system is started, the first priority may be set to 1000, and the second priority may be set to 1001. In this case, since the first controller has a lower priority (1000<1001), at this point the first controller should not access the storage area desired to access. In other words, the first controller fails in holding the lock, and the first lock flag set in the previous step needs to be updated to "unlocked."

In one embodiment of the present invention, the locking the storage area based on a comparison between the first priority and the second priority includes: in response to the first priority being higher than the second priority, unlocking the storage area by the second controller, and updating the second lock flag to "unlocked". Continuing the foregoing example, the first priority may be set to 1001, and the second priority may be set to 1000. In this case, since the first controller has a higher priority (1001>1000), at this point the first controller may access the storage area desired to access. In other words, the second controller fails in holding the lock, and the second lock flag needs to be updated to "unlocked."

Figure 7:
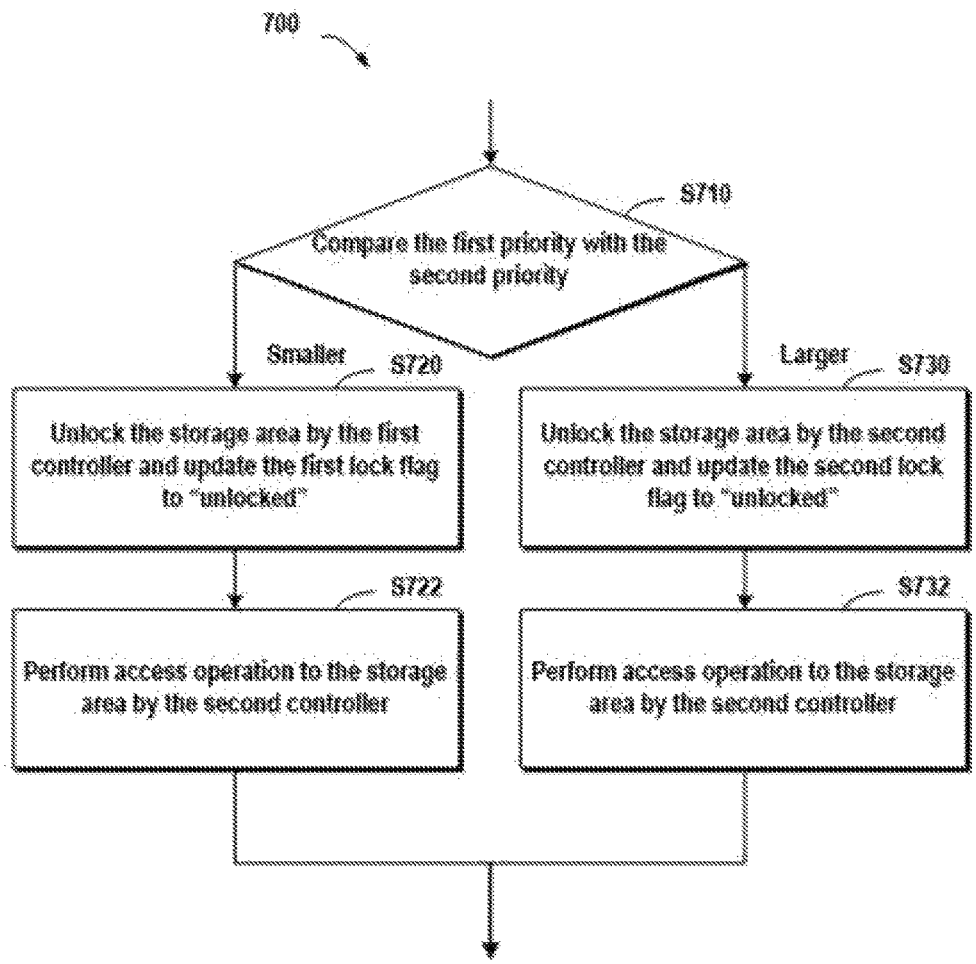
FIG. 7 schematically illustrates a flowchart of a method for locking a storage area in a storage system according to one embodiment of the present invention.

FIG. 7 schematically illustrates a flowchart 700 of a method for locking a storage area in a storage system according to one embodiment of the present invention. In step S710, the value of the first priority is compared with the value of the second priority. In response to the first priority being smaller than the second priority, the operation flow proceeds to step S720, in which a first controller unlocks the storage area and updates a first lock flag to "unlocked". Next in step S722, since a second controller has preferential access permission, the second controller may access the storage area.

In addition, in response to the first priority being higher than the second priority, the operation flow proceeds to step S730, in which the second controller unlocks the storage area and updates a second lock flag to "unlocked." Next in step S722, since the first controller has preferential access permission, the first controller accesses may access the storage area. In the context of the present invention, regarding a specific storage area, a controller with a higher priority may access the specific storage area preferentially; and a controller with a lower priority has to wait for the controller with a higher priority to unlock the storage area, before accessing the storage area.

In one embodiment of the present invention, the writing a first lock flag to the first communication area includes: determining, based on lock metadata contained in the storage system, an address of a lock flag associated with the storage area; and writing the first lock flag to the address so as to indicate that the storage area is locked by the first controller.

Figure 8:
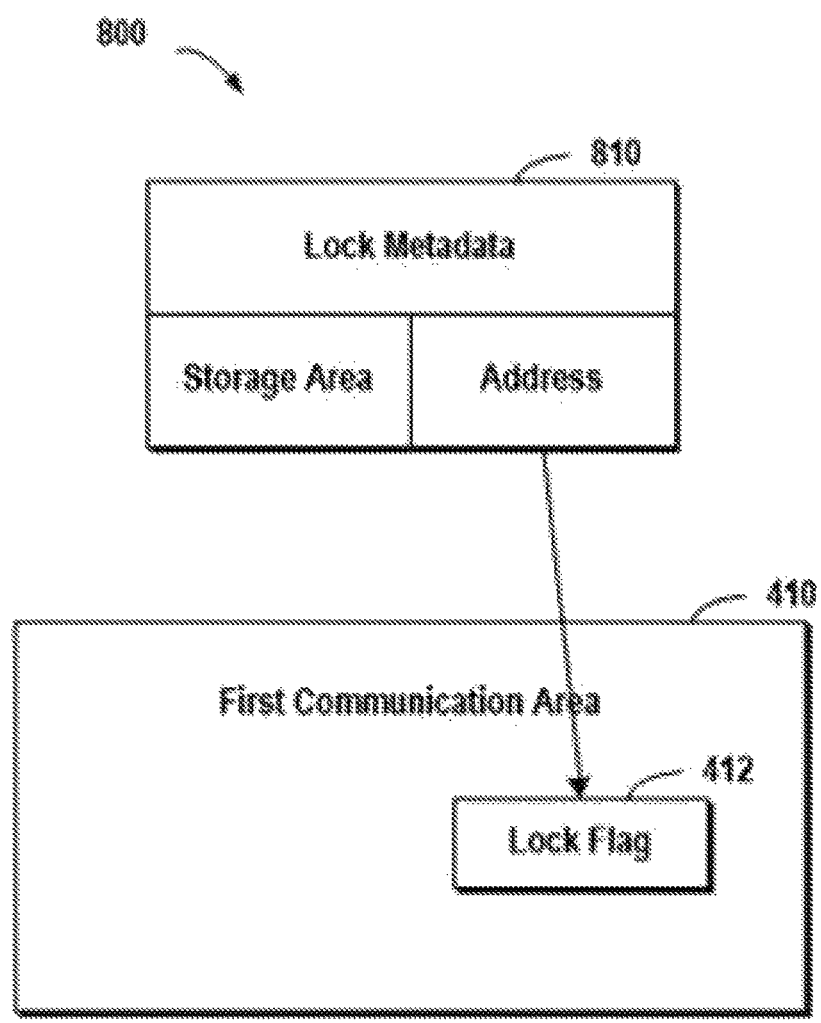
FIG. 8 schematically illustrates a schematic view of a relationship between lock metadata and a first communication area according to one embodiment of the present invention.

In this embodiment, the lock metadata may be set in the storage system for describing at which location a lock flag to be associated with the storage area is stored. Those skilled in the art may implement the embodiment using a lookup table, for example. A dedicated storage space may be allocated in the first communication area for storing the first and second priorities and the first and second lock flags associated with the specific storage area. FIG. 8 schematically illustrates a schematic view 800 of a relationship between lock metadata and the first communication area according to one embodiment of the present invention.

As shown in FIG. 8, a corresponding address may be looked up in a lock metadata 810 based on ID of a storage area. The address points to a space (e.g. address where the lock flag 412 is located) storing a lock flag in first communication area 410. Specifically, the lock metadata may be represented using a data structure as shown in Table 1 as below.

TABLE 1

Data Structure of Lock Metadata

| No. | Storage Area ID | Address of First Lock Flag | Address of Second Lock Flag |
|---|---|---|---|
| 1 | Storage Area 1 | Address-flag-1 | Address-flag-2 |
| 2 | Storage Area 2 | . . . | . . . |
| . . . | . . . | . . . | . . . |

As shown in the above Table 1, when receiving access to storage area 1, a first lock flag may be written to the address "Address-flag-1" in the first communication area and the second lock flag may be read from the address "Address-flag-2" via Table 1. Those skilled in the art should understand that Table 1 just schematically illustrates an example of a concrete data structure for saving lock metadata.

In other embodiments, those skilled in the art may define, according to needs of a concrete application environment, in which manner the lock metadata is stored, so long as the manner can define a mapping relationship between storage area IDs and concrete addresses. For example, a hash algorithm may be used for implementation. A hash table is a data structure that performs access according to key values, where the algorithm may perform access by mapping key values to locations in the table so as to speed up a lookup. Based on general principles of the hash algorithm, those skilled in the art may implement the hash algorithm that describes relationships between storage area IDs and addresses in the context of the present invention. In addition, although Table 1 shows only two fields, in other embodiments Table 1 may further include fields pointing to addresses of the first priority and the second priority.

In one embodiment of the present invention, there is further included: in response to the data access request at the first controller with respect to the storage area being completed, updating the first priority to be lower than the second priority. In one embodiment of the present invention, there is further included: in response to the data access request at the second controller with respect to the storage area having been completed, updating the second priority to be lower than the first priority.

The purpose of updating the priority of a controller with a higher priority lies in preventing the controller with a higher priority from locking the storage area for a long time. Therefore, after a controller successfully locks and accesses the storage area, the value of its priority may be decreased and the peer controller is made to have a higher priority. In this way, regarding subsequent access to the storage area, the peer controller has a higher priority and thus has preferential access permission. Afterwards, when the peer controller successfully accesses the storage area, its priority will also be decreased. In this embodiment, by updating priorities alternately, the two controllers will alternately obtain access permission to the storage area.

Continuing the foregoing example, suppose the first priority is 1001 and the second priority is 1000. When the first controller successfully executes lock, data access and lock release, the first priority may be decreased from 1001 to 999. In this way, the second controller has a higher priority and preferentially obtains access permission during subsequent access.

In other embodiments, another priority updating policy may further be adopted. For example, suppose the first controller is configured to process multiple urgent preferential access requests, then at this point the first priority may be updated to be lower than the second priority after the first controller has processed the multiple preferential access requests.

In one embodiment of the present invention, the storage system includes a plurality of storage devices, and the first communication area is deployed across the plurality of storage devices. In one embodiment of the present invention, the storage system includes a plurality of storage devices, and the second communication area is deployed across the plurality of storage devices. In this embodiment, the storage system may include a plurality of storage devices, and the plurality of storage devices may be ordinary disk devices and provide a larger storage area in the form of an array.

Specifically, the first communication area may provide a larger communication area across a plurality of storage devices, so as to hold priority data and lock flags with respect to more storage areas.

In one embodiment of the present invention, the storage system is a Redundant Array of Independent Disks, and the method further includes: in response to one storage device among the plurality of storage devices degrading, recovering data in the first communication area from other storage devices among the plurality of storage devices.

Figure 9:
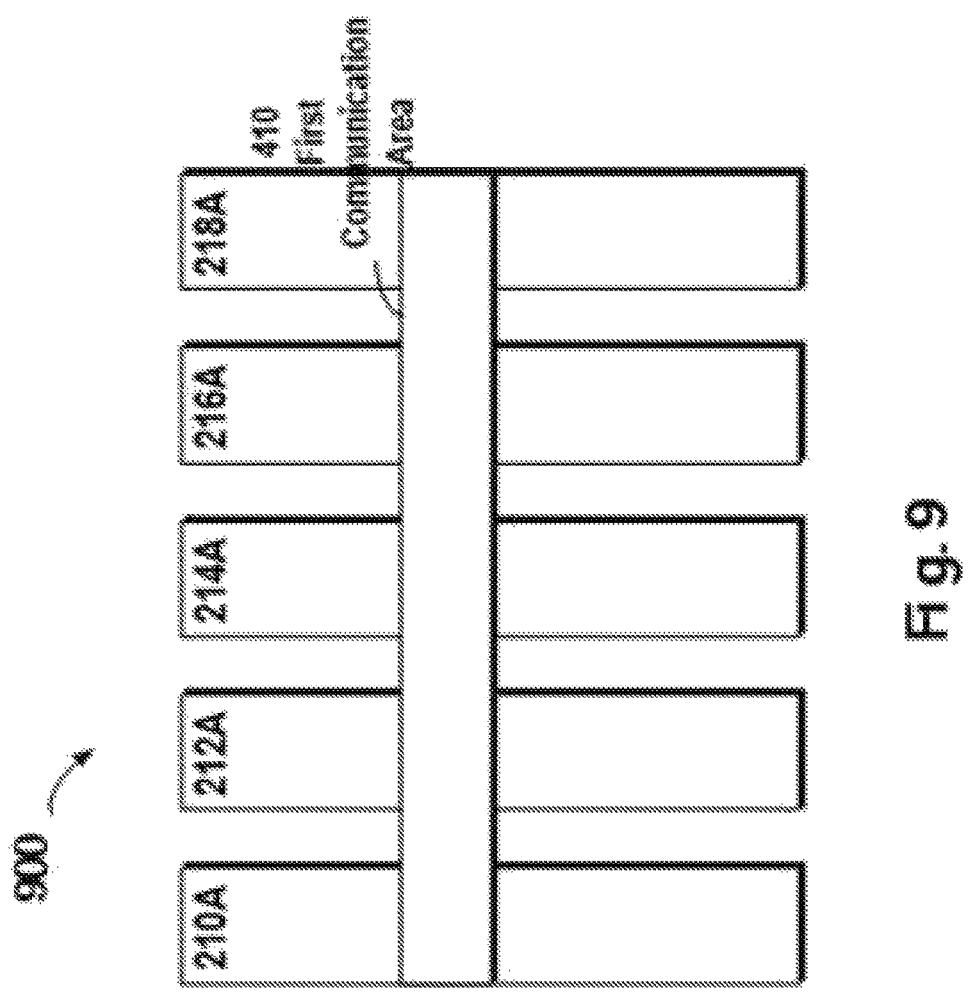
FIG. 9 schematically illustrates a schematic view of the first communication area deployed across a plurality of storage devices according to one embodiment of the present invention.

Specifically, FIG. 9 schematically illustrates a schematic view 900 of a first communication area deployed across a plurality of storage devices according to one embodiment of the present invention. As shown in FIG. 9, the first communication area 410 is deployed across RAID. Among the storage devices 210A, 212A, 214A, 216A and 218A, there is included redundant storage device(s). When one storage device in the storage system fails, priority data and lock flags about various storage devices in first communication area 410 may be recovered from data in other storage devices. In this way, when one storage device, e.g. 218A degrades, data in first communication area 410 may be recovered from the other four storage devices (e.g. with reference to the recovery process as shown in FIG. 2B). In this embodiment, lock information may be delivered between the two controllers in a more secure and reliable manner.

Note with reference to FIG. 9 above, there has been illustrated the case in which first communication area 410 is deployed across a plurality of storage devices in RAID and data in first communication area can be recovered from storage devices operating normally. In other embodiments, the second communication area may also be deployed in a like manner of the first communication area.

In one embodiment of the present invention, the storage area is one or more stripes in the storage system. Note the present invention does not limit the size of the storage area associated with data access operations. In different embodiments, sizes of the storage devices may be the same or different. Those skilled in the art may set locking mechanisms at different granularity according to needs of concrete application environments.

Figure 10:
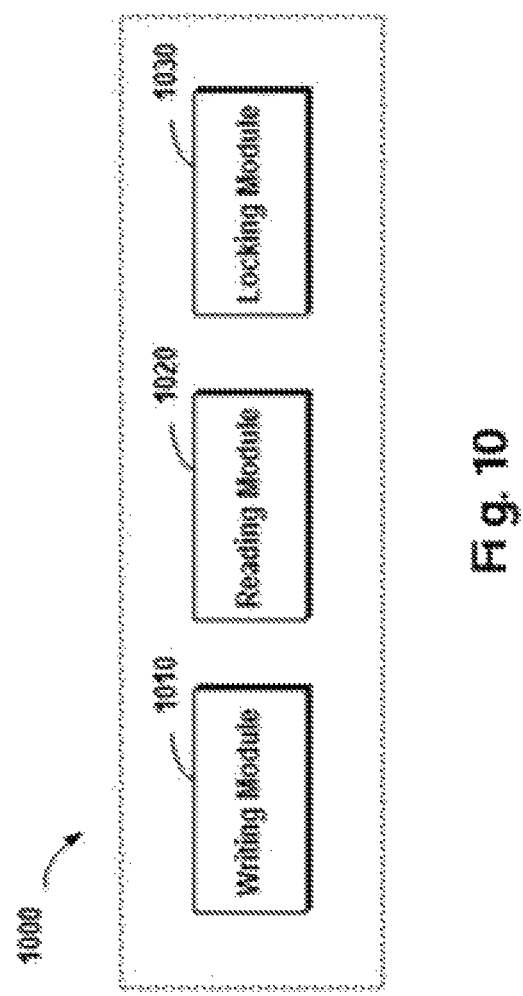
FIG. 10 schematically illustrates a block diagram of an apparatus for locking a storage area in a storage system according to one embodiment of the present invention.

FIG. 10 schematically illustrates a block diagram 1000 of an apparatus for locking a storage area in a storage system according to one embodiment of the present invention. Specifically, there is provided an apparatus for locking a storage area in a storage system, where the storage system includes a first controller, a second controller, a first communication area and a second communication area. The apparatus includes: a writing module 1010 configured to, in response to receiving at the first controller a data access request with respect to the storage area, write to the first communication area a first lock flag associated with the storage area, the first communication area being readable and writable to the first controller and being readable to the second controller; a reading module 1020 configured to read from the second communication area a second lock flag associated with the storage area, the second communication area being readable to the first controller and being readable and writable to the second controller; and a locking module 1030 configured to, in response to the second lock flag indicating that the storage area is not locked by the second controller, lock the storage area by the first controller.

In one embodiment of the present invention, there is further included: a priority module configured to, in response to the second lock flag indicating that the storage area is locked by the second controller, read from the first communication area a first priority associated with the first lock flag and read from the second communication area a second priority associated with the second lock flag; and lock the storage area based on a comparison between the first priority and the second priority.

In one embodiment of the present invention, the priority module is further configured to: in response to the first priority being lower than the second priority, unlock the storage area by the first controller; and update the first lock flag to "unlocked."

In one embodiment of the present invention, the priority module is further configured to: in response to the first priority being higher than the second priority, unlock the storage area by the second controller; and update the second lock flag to "unlocked."

In one embodiment of the present invention, the locking module 1030 is further configured to cause the first controller to lock the storage area.

In one embodiment of the present invention, the writing module 1010 is further configured to: determine an address of a lock flag associated with the storage area based on lock metadata contained in the storage system; and write the first lock flag to the address so as to indicate that the storage area is locked by the first controller.

In one embodiment of the present invention, there is further included: an updating module configured to in response to the data access request at the first controller with respect to the storage area being completed, update the first priority to be lower than the second priority.

In one embodiment of the present invention, the storage system includes a plurality of storage devices, and the first communication area is deployed across the plurality of storage devices.

In one embodiment of the present invention, the storage system is a Redundant Array of Independent Disks, and the apparatus further includes: a recovering module configured to in response to one storage device among the plurality of storage devices degrading, recover data in the first communication data from other storage devices among the plurality of storage devices.

In one embodiment of the present invention, the storage area is one or more stripes in the storage system.

In one embodiment of the present invention, there is provided a system for locking a storage area in a storage system. The system includes: one or more processors; a memory coupled to at least one processor of the one or more processors; computer program instructions stored in the memory, when executed by the at least one processor, the computer program instructions causing the system to execute a method for locking a storage area in a storage system. The method including: in a storage system including a first controller, a second controller, a first communication area and a second communication area, in response to receiving at the first controller a data access request with respect to the storage area, writing to the first communication area a first lock flag associated with the storage area, the first communication area being readable and writable to the first controller and being readable to the second controller; reading from the second communication area a second lock flag associated with the storage area, the second communication area being readable to the first controller and being readable and writable to the second controller; and in response to the second lock flag indicating that the storage area is not locked by the second controller, locking the storage area by the first controller.

In one embodiment of the present invention, the method further includes: in response to the second lock flag indicating that the storage area is locked by the second controller, reading from the first communication area a first priority associated with the first lock flag and reading from the second communication area a second priority associated with the second lock flag; and locking the storage area based on a comparison between the first priority and the second priority.

In one embodiment of the present invention, the locking the storage area based on a comparison between the first priority and the second priority includes: in response to the first priority being lower than the second priority, unlocking the storage area by the first controller; and updating the first lock flag to "unlocked".

In one embodiment of the present invention, the locking the storage area based on a comparison between the first priority and the second priority includes: in response to the first priority being higher than the second priority, unlocking the storage area by the second controller, and updating the second lock flag to "unlocked".

In one embodiment of the present invention, the method further includes: locking the storage area by the first controller.

In one embodiment of the present invention, the writing to the first communication area a first lock flag includes: determining an address of a lock flag associated with the storage area based on lock metadata contained in the storage system; and writing the first lock flag to the address so as to indicate that the storage area is locked by the first controller.

In one embodiment of the present invention, the method further includes: in response to the data access request at the first controller with respect to the storage area having been completed, updating the first priority to be lower than the second priority.

In one embodiment of the present invention, the storage system includes a plurality of storage devices, and the first communication area is deployed across the plurality of storage devices.

In one embodiment of the present invention, the storage system is a Redundant Array of Independent Disks, and the method further includes: in response to one storage device among the plurality of storage devices degrading, recovering data in the first communication data from other storage devices among the plurality of storage devices.

In one embodiment of the present invention, the storage area is one or more stripes in the storage system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for locking a storage area in a storage system, the storage system comprising a first controller, a second controller, a first communication area and a second communication area, the method comprising:
   in response to receiving at the first controller a data access request with respect to the storage area, writing to the first communication area a first lock flag associated with the storage area, the first communication area being readable and writable to the first controller and being readable to the second controller;
   reading from the second communication area a second lock flag associated with the storage area, the second communication area being readable to the first controller and being readable and writable to the second controller;
   in response to the second lock flag indicating that the storage area is not locked by the second controller, locking the storage area by the first controller; and
   in response to the second lock flag indicating that the storage area is locked by the second controller:
      reading from the first communication area a first priority associated with the first lock flag and reading from the second communication area a second priority associated with the second lock flag; and
      locking the storage area based on a comparison between the first priority and the second priority.

2. The method according to claim 1, wherein the locking the storage area based on a comparison between the first priority and the second priority comprises:
   in response to the first priority being lower than the second priority, unlocking the storage area by the first controller, and updating the first lock flag to "unlocked".

3. The method according to claim 1, wherein the locking the storage area based on a comparison between the first priority and the second priority comprises:
   in response to the first priority being higher than the second priority, unlocking the storage area by the second controller, and updating the second lock flag to "unlocked".

4. The method according to claim 3, further comprising: locking the storage area by the first controller.

5. A method for locking a storage area in a storage system, the storage system comprising a first controller, a second controller, a first communication area and a second communication area, the method comprising:
   in response to receiving at the first controller a data access request with respect to the storage area, writing to the first communication area a first lock flag associated with the storage area, the first communication area being readable and writable to the first controller and being readable to the second controller;
   reading from the second communication area a second lock flag associated with the storage area, the second communication area being readable to the first controller and being readable and writable to the second controller; and in response to the second lock flag indicating that the storage area is not locked by the second controller, locking the storage area by the first controller, wherein the writing to the first communication area a first lock flag comprises:

determining an address of a lock flag associated with the storage area based on lock metadata contained in the storage system; and writing the first lock flag to the address so as to indicate that the storage area is locked by the first controller.

6. The method according to claim 1, further comprising:

in response to the data access request at the first controller with respect to the storage area having been completed, updating the first priority to be lower than the second priority.

7. A method for locking a storage area in a storage system, the storage system comprising a first controller, a second controller, a first communication area and a second communication area, the method comprising:

in response to receiving at the first controller a data access request with respect to the storage area, writing to the first communication area a first lock flag associated with the storage area, the first communication area being readable and writable to the first controller and being readable to the second controller;

reading from the second communication area a second lock flag associated with the storage area, the second communication area being readable to the first controller and being readable and writable to the second controller;

in response to the second lock flag indicating that the storage area is not locked by the second controller, locking the storage area by the first controller, wherein the storage system comprises a plurality of storage devices, and the first communication area is deployed across the plurality of storage devices, and wherein the storage system is a Redundant Array of Independent Disks; and in response to one storage device among the plurality of storage devices degrading, recovering data in the first communication data from other storage devices among the plurality of storage devices.

8. The method according to claim 1, wherein the storage area is one or more stripes in the storage system.

9. A system for locking a storage area in a storage system, comprising:

one or more processors;

a memory coupled to at least one processor of the one or more processors;

computer program instructions stored in the memory, when executed by the at least one processor, the computer program instructions causing the system to execute a method for locking a storage area in a storage system, the method comprising:

in a storage system comprising a first controller, a second controller, a first communication area and a second communication area, in response to receiving at the first controller a data access request with respect to the storage area, writing to the first communication area a first lock flag associated with the storage area, the first communication area being readable and writable to the first controller and being readable to the second controller;

reading from the second communication area a second lock flag associated with the storage area, the second communication area being readable to the first controller and being readable and writable to the second controller;

in response to the second lock flag indicating that the storage area is not locked by the second controller, locking the storage area by the first controller; and in response to the second lock flag indicating that the storage area is locked by the second controller;

reading from the first communication area a first priority associated with the first lock flag and reading from the second communication area a second priority associated with the second lock flag; and locking the storage area based on a comparison between the first priority and the second priority.

10. The system according to claim 9, wherein the locking the storage area based on a comparison between the first priority and the second priority comprises:

in response to the first priority being lower than the second priority, unlocking the storage area by the first controller, and updating the first lock flag to "unlocked".

11. The system according to claim 9, wherein the locking the storage area based on a comparison between the first priority and the second priority comprises:

in response to the first priority being higher than the second priority, unlocking the storage area by the second controller; and updating the second lock flag to "unlocked".

12. The system according to claim 11, wherein the method further comprises:

locking the storage area by the first controller.

13. A system for locking a storage area in a storage system, comprising:

one or more processors;

a memory coupled to at least one processor of the one or more processors;

computer program instructions stored in the memory, when executed by the at least one processor, the computer program instructions causing the system to execute a method for locking a storage area in a storage system, the method comprising:

in a storage system comprising a first controller, a second controller, a first communication area and a second communication area, in response to receiving at the first controller a data access request with respect to the storage area, writing to the first communication area a first lock flag associated with the storage area, the first communication area being readable and writable to the first controller and being readable to the second controller;

reading from the second communication area a second lock flag associated with the storage area, the second communication area being readable to the first controller and being readable and writable to the second controller; and in response to the second lock flag indicating that the storage area is not locked by the second controller, locking the storage area by the first controller, wherein the writing to the first communication area a first lock flag comprises:

determining an address of a lock flag associated with the storage area based on lock metadata contained in the storage system; and writing the first lock flag to the address so as to indicate that the storage area is locked by the first controller.

14. The system according claim 9, wherein the method further comprises:
   in response to the data access request of the first controller with respect to the storage area having been completed, updating the first priority to be lower than the second priority.

15. A system for locking a storage area in a storage system, comprising:
   one or more processors;
   a memory coupled to at least one processor of the one or more processors;
   computer program instructions stored in the memory, when executed by the at least one processor, the computer program instructions causing the system to execute a method for locking a storage area in a storage system, the method comprising:
      in a storage system comprising a first controller, a second controller, a first communication area and a second communication area, in response to receiving at the first controller a data access request with respect to the storage area, writing to the first communication area a first lock flag associated with the storage area, the first communication area being readable and writable to the first controller and being readable to the second controller;
      reading from the second communication area a second lock flag associated with the storage area, the second communication area being readable to the first controller and being readable and writable to the second controller;
      in response to the second lock flag indicating that the storage area is not locked by the second controller, locking the storage area by the first controller, wherein the storage system comprises a plurality of storage devices, and the first communication area is deployed across the plurality of storage devices, and wherein the storage system is a Redundant Array of Independent Disks; and
      in response to one storage device among the plurality of storage devices degrading, recovering data in the first communication data from other storage devices among the plurality of storage devices.

* * * * *